United States Patent
Erhart et al.

(10) Patent No.: US 8,494,148 B2
(45) Date of Patent: Jul. 23, 2013

(54) DYNAMIC IVR DIALOG BASED ON ANALYTICS DATA

(75) Inventors: George William Erhart, Loveland, CO (US); Valentine C. Matula, Granville, OH (US); David Joseph Skiba, Golden, CO (US)

(73) Assignee: Avaya, Inc., Basking Ridge, NJ (US)

( * ) Notice: Subject to any disclaimer, the term of this patent is extended or adjusted under 35 U.S.C. 154(b) by 654 days.

(21) Appl. No.: 12/566,466

(22) Filed: Sep. 24, 2009

(65) Prior Publication Data

US 2011/0069828 A1   Mar. 24, 2011

(51) Int. Cl.
*H04M 3/00* (2006.01)
*H04M 5/00* (2006.01)
*H04M 3/42* (2006.01)

(52) U.S. Cl.
USPC ........... 379/245; 379/207.12; 379/207.15; 379/242; 379/246

(58) Field of Classification Search
USPC ........... 379/245, 88.23, 242, 246, 207.15, 379/207.12, 142.01, 265.09; 370/259
See application file for complete search history.

(56) References Cited

U.S. PATENT DOCUMENTS

| | | | |
|---|---|---|---|
| 6,016,336 A | 1/2000 | Hanson | |
| 6,061,433 A | 5/2000 | Polcyn et al. | |
| 6,405,170 B1 | 6/2002 | Phillips et al. | |
| 7,065,188 B1 | 6/2006 | Mei et al. | |
| 7,386,103 B1 | 6/2008 | Chahal | |
| 7,515,695 B1 | 4/2009 | Chan et al. | |
| 7,983,401 B1 * | 7/2011 | Krinsky | 379/88.23 |
| 2003/0103608 A1 | 6/2003 | Pearson et al. | |
| 2003/0161464 A1 | 8/2003 | Rodriguez et al. | |
| 2004/0122941 A1 | 6/2004 | Creamer et al. | |
| 2004/0193403 A1 | 9/2004 | Creamer et al. | |
| 2007/0133759 A1 | 6/2007 | Malik et al. | |
| 2007/0133777 A1 | 6/2007 | Agapi et al. | |
| 2007/0220127 A1 | 9/2007 | Adams et al. | |
| 2009/0252067 A1 * | 10/2009 | McGary | 370/259 |

FOREIGN PATENT DOCUMENTS

| | | |
|---|---|---|
| EP | 0903920 A2 | 3/1999 |
| WO | 9850907 | 11/1998 |
| WO | 0150453 A2 | 7/2001 |

OTHER PUBLICATIONS

Morris, Euros, "GB Application No. GB1005132.4 Search Report Jul. 9, 2010", , Publisher: UK IPO, Published in: GB.
Chen, "A System and Method for Displaying Call Flows and Call Statistics", "U.S. Appl. No. 12/211,368", , Publisher: USPTO, Published in: US, Submitted on Sep. 24, 2009.

* cited by examiner

*Primary Examiner* — Thjuan K Addy

(57) ABSTRACT

A method comprising receiving, at a call-processing switch, a call from a calling entity in which the calling entity is a natural person and a telecommunications terminal, and, wherein the call received at the call-processing switch comprises (i) the identity of the caller telecommunications terminal, (ii) the identity of the caller, and (iii) the geo-location of the calling entity. Upon receiving the call, the call-processing switch identifies (i) global contextual information, (ii) contextual information at the calling entity, and (iii) contextual information at the call-processing switch, wherein the temporal order and the hierarchical order of menu items in a menu are reconfigured for presentation to the calling entity based on (i) the identity of the caller telecommunications terminal, (ii) the identity of the caller, (iii) the geo-location of the calling entity, (iv) global contextual information, (v) contextual information at the calling entity, and (vi) contextual information at the call-processing switch.

5 Claims, 6 Drawing Sheets

Telecommunications System 100

DYNAMIC IVR DIALOG BASED ON ANALYTICS DATA

FIELD OF THE INVENTION

The present invention relates to telecommunications in general, and, more particularly, to improving the temporal order and the hierarchical order of menu items in an interactive voice response system.

BACKGROUND OF THE INVENTION

When a caller contacts an enterprise to obtain information, how does the enterprise determine what type of information the caller is trying to obtain?

When a caller contacts an enterprise to obtain information, such as banking information, airline information, product information, etc., the caller is initially presented with an interactive voice response system that queries the caller to make a selection from a plurality of menu items (i.e., a first menu item, a second menu item, a third menu item, etc.). That is, the interactive voice response system is a predefined hierarchical menu which comprises a plurality of menu items that are presented to the caller in the same temporal order and the same hierarchical order each time the caller contacts the enterprise.

This predefined hierarchical menu is inefficient, for example, when a caller contacts an enterprise several times to obtain the same information or information that is similar to past calls.

For example, when a caller is contacting an enterprise to obtain information regarding the "ring-tone" feature on his "cell phone," the enterprise initially presents the caller with a first menu that comprises three menu items, such as:

What type of terminal are you having a problem with?
  i. Please say "cell phone" or press "1" on your keypad, or
  ii. Please say "smart-phone" or press "2" on your keypad, or
  iii. Please say "personal digital assistant" or press "3" on your keypad.

After receiving a response to the first menu, the enterprise presents the caller with a second menu that comprises three more menu items, such as:

What is the problem with your cell phone?
  i. Please say "Internet connectivity" or press "1" on your keypad, or
  ii. Please say "cell phone application" or press "2" on your keypad, or
  iii. Please say "other cell phone problems" or press "3" on your keypad After receiving a response to the second menu, the enterprise presents the caller with a third menu that comprises three more menu items, such as:

What type of cell phone application are you having a problem with?
  i. Please say "e-mail" or press "1" on your keypad, or
  ii. Please say "short-message-service" or press "2" on your keypad, or
  iii. Please say "ring-tone" or press "3" on your keypad.

As illustrated in this example, the caller must navigate through the first menu, the second menu, and the third menu to select the desired menu item (i.e., the menu item "ring-tone" in the third menu). If the caller is having reoccurring problems with his "ring-tone" feature on his "cell phone," the caller may become angered, annoyed, and frustrated because the caller is forced to navigate through the first menu, the second menu, and the third menu of the predefined hierarchical menu during each subsequent call to obtain the same or similar information as past calls.

Therefore, there exists a need for a method and a system that can automatically reconfigure the temporal order and the hierarchical order of menu items in a hierarchical menu so that callers can quickly obtain the information they desire.

SUMMARY OF THE INVENTION

The present invention provides a method and a system that avoids some of the costs and disadvantages associated with interactive voice response systems in the prior art.

When a call-processing switch receives a call from a calling entity (i.e., a caller and a caller telecommunications terminal associated with the caller), the call-processing switch receives:
  i. an identity of the caller telecommunications terminal, or
  ii. an identity of the caller at the caller telecommunications terminal, or
  iii. a geo-location of the calling entity, or
  iv. a combination of i, ii, and iii.

Upon receiving the call from the calling entity, the call-processing switch will identify global contextual information. In other words, global contextual information comprises information that is accessible to the public through mass media. For example, and without limitation, global contextual information may comprise:
  i. information regarding political events in various countries, or
  ii. information regarding financial market indexes in various countries, or
  iii. information regarding naturally occurring catastrophes in various countries, or
  iv. any combination of i, ii, and iii.

Additionally, the call-processing switch will identify contextual information at the calling entity by using the geo-location of the calling entity. For example, and without limitation, contextual information at the calling entity may comprise:
  i. information regarding political events at the geo-location of the calling entity, or
  ii. information regarding the weather at the geo-location of the calling entity, or
  iii. information regarding epidemics at the geo-location of the calling entity, or
  iv. any combination of i, ii, and iii.

Additionally, the call-processing switch will identify contextual information at the call-processing switch by using the geo-location of the call-processing switch. For example, and without limitation, contextual information at the call-processing switch may comprise:
  i. information regarding political events at the geo-location of the call-processing switch entity, or
  ii. information regarding the weather at the geo-location of the call-processing switch, or
  iii. information regarding epidemics at the geo-location of the call-processing switch, or
  iv. any combination of i, ii, and iii.

Based at least in part on the information received and identified at the call-processing switch, the temporal order and the hierarchical order of menu items are reconfigured for presentation and transmission to the calling entity.

The call-processing switch receives a selection from the calling entity in response to the transmitted menu items and performs an operation based, at least in part, on the selection received from the calling entity.

The illustrative embodiment of the present invention comprises: A method comprising: (i) receiving at a switch, a call from a calling entity and (ii) transmitting from the switch to the calling entity, a first menu item, a second menu item, and a third menu item in a temporal order and a hierarchical order based, at least in part, on a geo-location of the calling entity.

DETAILED DESCRIPTION

Figure 1:
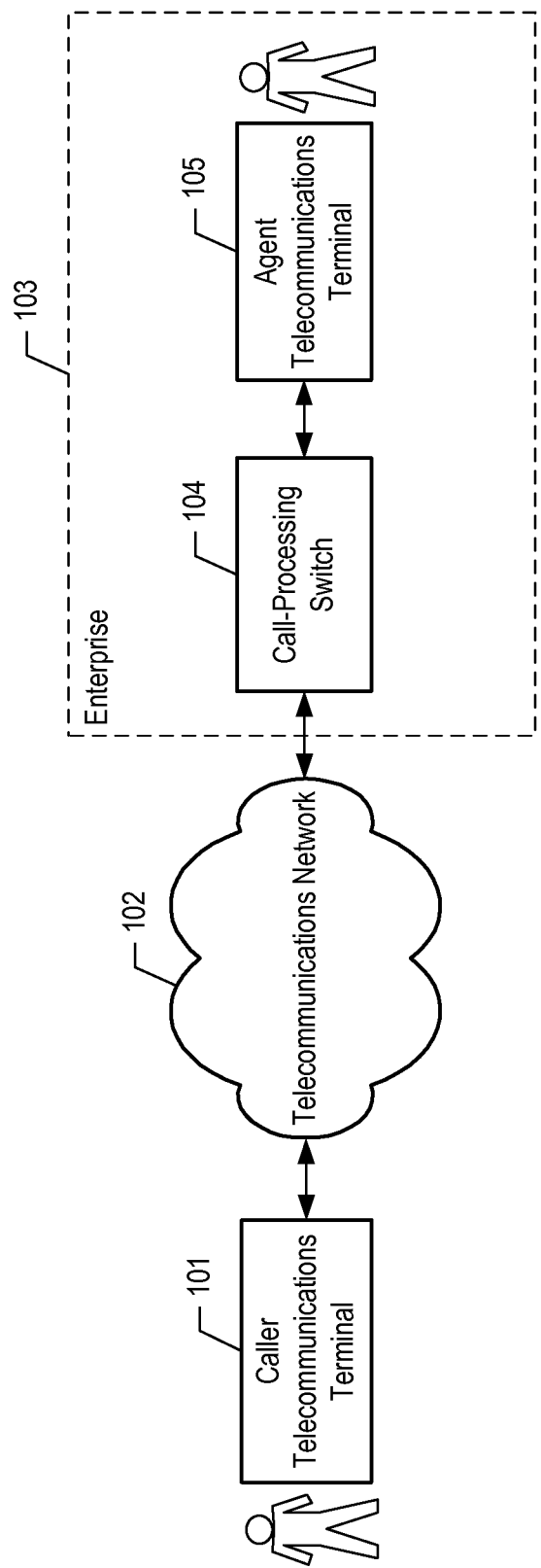
FIG. 1 depicts a schematic diagram of the salient components of telecommunications systems 100 in accordance with the illustrative embodiment of the present invention.

FIG. 1 depicts a schematic diagram of the salient components of telecommunications systems 100 in accordance with the illustrative embodiment of the present invention. Telecommunications system 100 comprises: caller telecommunications terminal 101, telecommunications network 102, and enterprise 103, which comprises call-processing switch 104, and agent telecommunications terminal 105.

Although the illustrative embodiment comprises one caller terminal 101, it will be clear to those skilled in the art, after reading this disclosure, how to make and use alternative embodiments of the present invention that comprise any number of caller terminals (e.g., two caller terminals, three caller terminals, four caller terminals, etc.)

Although the illustrative embodiment comprises one telecommunications network 102, it will be clear to those skilled in the art, after reading this disclosure, how to make and use alternative embodiments of the present invention that comprises any number and combination of telecommunications networks.

Although the illustrative embodiment comprises one enterprise 103, it will be clear to those skilled in the art, after reading this disclosure, how to make and use alternative embodiments of the present invention that comprises any number of enterprises.

Although the illustrative embodiment comprises one call-processing switch 104, it will be clear to those skilled in the art, after reading this disclosure, how to make and use alternative embodiments of the present invention that comprises any number or any combination of call-processing switches.

Although the illustrative embodiment comprises one agent terminal 105, it will be clear to those skilled in the art, after reading this disclosure, how to make and use alternative embodiments of the present invention that comprises any number of agent terminals (e.g., two agent terminals, three agent terminals, four agent terminals, etc.)

Caller terminal 101 comprises hardware and software that enables a caller to contact and interact with:
i. enterprise 103,
ii. call-processing switch 104, and
iii. agent terminal 105 through telecommunications terminal 102. In accordance with the illustrative embodiment, caller terminal 101 is a wireless terminal (e.g., a cell phone, a personal digital assistant, a smart-phone, etc.), but it will be clear to those skilled in the art, after reading this disclosure, how to make and use alternative embodiments of the present invention in which some or all of the caller terminals connect to telecommunications network 102 via wireline (e.g., an office deskset, a desktop, a computer, etc.)

Additionally, it will be clear to those skilled in the art, after reading this disclosure, how to make and use alternative embodiments of the present invention in which caller terminal 101 enables a caller to contact enterprise 103, call-processing switch 104, and agent terminal 105 via a different modality, for example, and without limitation, web requests, e-mail, instant messaging, short-message service, video, etc. In any case, it will be clear to those skilled in the art, after reading this disclosure, how to make and use caller terminal 101.

Telecommunications network 102 is the Public Switched Telephone Network (PSTN), but it will be clear to those skilled in the art, after reading this disclosure, how to make and use alternative embodiments of the present invention in which telecommunications network 102 is a different network or a combination of different networks, for example, and without limitation, the Internet, a private data network, a satellite network, etc.

Enterprise 103 is a building for housing call-processing switch 104, agent terminal 105 and an agent associated with agent terminal 105. In accordance with the illustrative embodiment, agent terminal 105 and the agent are co-located with call-processing switch 104 in enterprise 103, but it will be clear to those skilled in the art, after reading this disclosure, how to make and use alternative embodiments of the present invention in which some or all of the agent terminals and agents are not co-located with call-processing switch 104.

Call-processing switch 104 comprises hardware and software that enables it to, for example:
  i. provide the functionality of a private-branch exchange (PBX) that receives incoming calls from a caller terminal through telecommunications network 102, or
  ii. connect incoming calls to an interactive voice response (IVR) system, or
  iii. connect incoming calls to an agent associated with agent terminal 105, or
  iv. identify global contextual information, contextual information at the calling entity, and contextual information at the call-processing switch 104, or
  v. determine a temporal order and a hierarchical order of a plurality of menu items (e.g., a first menu item, a second menu item, a third menu item, etc.), which will be described below and with respect to task 203, or
  vi. transmit the menu items to the calling entity in the temporal order and the hierarchical order as determined, or
  vii. receive a selection of a menu item from the calling entity in response to the transmitted menu, or
  viii. perform an operation based, at least in part, on the selection received from the calling entity, or
  ix. any combination of i, ii, iii, iv, v, vi, vii, and viii.

In particular, call-processing switch 104 is capable of performing the tasks described below and in the accompanying figures.

Agent terminal 105 comprises hardware and software that enables an agent to contact and interact with caller terminal 101 and call-processing switch 104 in well-known fashion. In accordance with the illustrative embodiment, agent terminal 105 is a wireline terminal (e.g., an office deskset, a desktop, a computer, etc.), but it will be clear to those skilled in the art, after reading this disclosure, how to make and use alternative embodiments of the present invention in which some or all of the agent terminals connect to telecommunications network 102 via wireless (e.g., a cell phone, a personal digital assistant, a smart-phone, etc.)

Additionally, it will be clear to those skilled in the art, after reading this disclosure, how to make and use alternative embodiments of the present invention in which agent terminal 105 is enabled to contact caller terminal 101 via a different modality, for example, and without limitation, e-mail, instant messaging, short-message service, video, etc. In any case, it will be clear to those skilled in the art, after reading this disclosure, how to make and use agent terminal 105.

Figure 2:
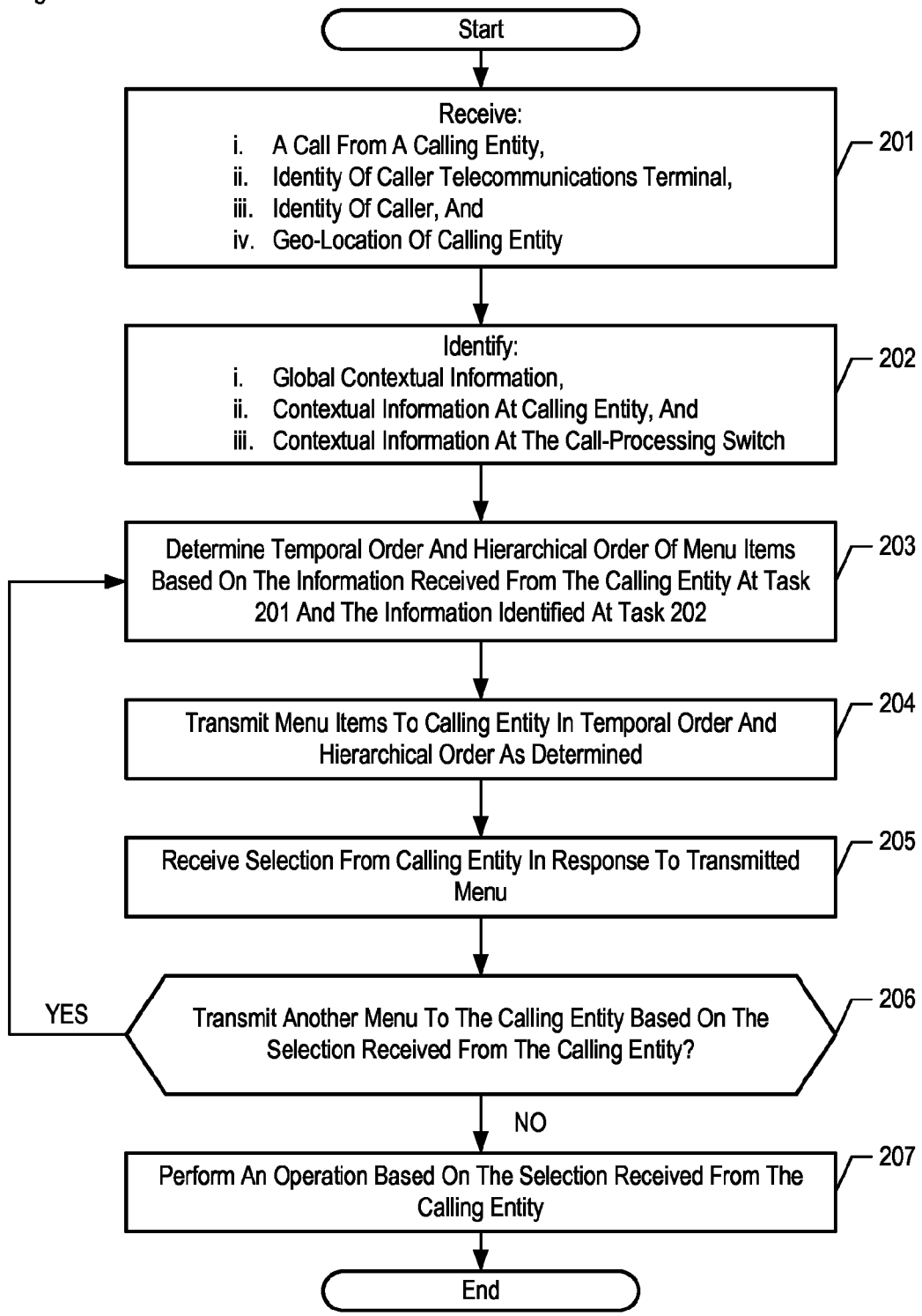
FIG. 2 depicts a flowchart of the salient tasks associated with the operation of the illustrative embodiment of the present invention.

FIG. 2 depicts a flowchart of the salient tasks associated with the operation of the illustrative embodiment of the present invention.

It will be clear to those skilled in the art, after reading this disclosure, how to make and use alternative embodiments of the present invention in which tasks 201, 202, 203, 204, 205, and 206 are performed in a different order or are performed concurrently. Furthermore, it will be clear to those skilled in the art, after reading this disclosure, how to make and use alternative embodiments of the present invention that omit one or more tasks 201, 202, 203, 204, 205, and 206.

For the purpose of this specification, the term "calling entity" comprises a caller that is a natural person and a caller telecommunications terminal associated with the caller. The term "calling entity" will be used throughout this specification to refer to both the caller and the caller terminal 101.

At task 201, the call-processing switch 104 receives a call from a calling entity (i.e., a caller and the caller terminal 101 associated with the caller).

As part of task 201, the call-processing switch 104 receives the identity of the caller terminal 101.

In accordance with the illustrative embodiment, call-processing switch 104 comprises the hardware and software to enable it to identify the identity of caller terminal 101 by using, for example, and without limitation, an automatic number identification (ANI) equipment associated with the call-processing switch 104. In other words, when the caller terminal 101 transmits a signal to establish a connection with call-processing switch 104, and, upon receiving the signal at the call-processing switch 104, the automatic number identification equipment analyzes the signal to identify the telephone number of caller terminal 101.

It will be clear to those skilled in the art, after reading this disclosure, how to make and use alternative embodiments of the present invention in which the call-processing switch 104 also comprises the hardware and software to enable it to identify any type of indicia that is indicative of the identity of caller terminal 101. For example, and without limitation, call-processing switch 104 is configured to identify:
   i. a Media Access Control (MAC) address that identifies the identity of caller terminal 101, or
   ii. an Internet Protocol (IP) address that identifies the identity of caller terminal 101, or
   iii. a Public Safety Answering Point (PSAP) signal that identifies the identity and location of caller terminal 101, or
   iv. any combination of i, ii, and iii.

As part of task 201, the call-processing switch 104 receives the identity of the caller associated with caller terminal 101.

In accordance with the illustrative embodiment, call-processing switch 104 comprises the hardware and software to enable it to identify the identity of the caller. For example, the call-processing switch 104 transmits a request to the caller via the caller terminal 101 requesting that the caller provide an identifier, such as his account number. After the caller has provided his account number, a signal is transmitted from the caller terminal 101 to the call-processing switch 104. Once the signal is received at the call-processing switch 104, a database search of the caller's account number is performed to identify the caller's identity.

It will be clear to those skilled in the art, after reading this disclosure, how to make and use alternative embodiments of the present invention in which the caller identifier could be, for example, and without limitation:
   i. the caller's credit-card number, or
   ii. the caller's social-security number, or
   iii. the caller's e-mail address, or
   iv. the caller's user name and password, or
   v. the caller's employee number, or
   vi. any combination of i, ii, iii, iv, and v.

As part of task 201, the call-processing switch 104 also receives the geo-location of the calling entity.

In accordance with the illustrative embodiment, when the caller terminal 101 transmits the signal to establish a connection with call-processing switch 104, the automatic number identification (ANI) equipment associated with the call-processing switch 104 analyzes the signal to identify the geo-location of the calling entity.

It will be clear to those skilled in the art, after reading this disclosure, how to make and use alternative embodiments of the present invention in which the call-processing switch 104 identifies the geo-location of the calling entity by, for example, and without limitation:
   i. a Global Positioning System (GPS) that indicative of the location of caller terminal 101, or
   ii. an Internet Protocol (IP) address that indicative of the location of caller terminal 101, or
   iii. a Public Safety Answering Point (PSAP) signal that indicative of the location of caller terminal 101, or
   iv. any combination of i, ii, and iii.

With respect to a GPS signal that is indicative of the caller terminal 101's geo-location, caller terminal 101 comprises the hardware and software to enable it to have global positioning functionalities so that the caller terminal 101 can transmit, for example, and without limitation, a signal that comprises the geo-location of the calling entity to the call-processing switch 104. For example, and without limitation, the caller terminal 101 is equipped with a GPS receiver that trilaterates the geo-location of terminal 101 by using data from at least three satellites and the GPS receiver.

With respect to an IP address that is indicative of the caller terminal 101's geo-location, a table that comprises the IP address of caller terminal 101, the address of an Internet Service Provider (ISP) of caller terminal 101, the address of a gateway that serves the caller terminal 101, the address of a server that serves the caller terminal 101, etc. is used to identify the geo-location of the caller terminal.

For example, when the call-processing switch 104 uses the IP address of a caller's terminal, the call-processing switch 104 can determine the geo-location of the caller's terminal by using Table 1.

TABLE 1

IP Address of a Caller Terminal Mapped To a Geo-Location

| IP Address of A Caller Terminal | Geo-Location |
|---|---|
| 255.11.111.111 | New York, New York |
| 255.22.222.222 | Holmdel, New Jersey |
| 255.33.333.333 | Tokyo, Japan |
| . . . | Toronto, Canada |
| . . . | Madrid, Spain |
| . . . | Florence, Italy |
| 255.99.999.999 | Phoenix, Arizona |

It will be clear to those skilled in the art, after reading this disclosure, how to make and use alternative embodiments of the present invention in which the IP address illustrated in Table 1 can be in a different format (e.g., IPv4, IPv6, etc.), and wherein the call-processing switch 104 comprises the hardware and software to enable it to determine the geo-location of a caller's terminal regardless of the IP address format.

With respect to a Public Safety Answering Point (PSAP) signal that indicative of the location of caller terminal 101, a Public Safety Answering Points (PSAP) can use an automatic number identification (ANI) equipment to analyze an incoming call from the caller terminal 101 and transmit a signal to the call-processing switch 104 that includes the geo-location of the caller terminal 101.

At task 202, the call-processing switch 104 identifies one or more global contextual information based, at least in part, on a database or a terminal (e.g., a Bloomberg Terminal) that stores information, data, statistics, records, etc. associated with one or more countries, for example, and without limitation, the United States of America, Great Britain, Spain, China, Japan, Canada, etc.

For the purpose of this specification, the term "global contextual information" comprises information that is accessible to the public through mass media in one or more regions of the world (e.g., countries, states, counties, etc.), for example, and without limitation:
   i. radio networks, or
   ii. newspapers, or
   iii. magazines, or
   iv. books, or
   v. manuscripts, or
   vi. the Internet (e.g., blogs, message boards, podcasts, video sharing, etc.), or
   vii. television, or
   viii. electronic media, or
   ix. print media, or
   x. any combination of i, ii, iii, iv, v, vi, vii, viii, and ix.

In accordance with the illustrative embodiment, upon receiving a call from the calling entity, the call-processing switch 104 queries a database or a terminal to retrieve global contextual information, which comprises, for example, and without limitation:
   i. information regarding political events in various countries, provinces, prefectures, states, counties, etc., or
   ii. information regarding the weather in various countries, provinces, prefectures, states, counties, etc., or
   iii. information regarding financial market indexes in various countries (e.g., NASDAQ, Dow Jones Industrial Average, Nikkei 225, etc.), or
   iv. information regarding naturally occurring catastrophes in various countries (e.g., Hurricane Katrina of 2005, Indian Ocean tsunami of 2004, Sichuan earthquake of 2008, etc.), or
   v. information regarding epidemics in various countries (e.g., Avian flu, Swine flu, AIDS, HIV, etc.), or
   vi. information regarding sporting events in various countries (e.g., Olympics, World Cup, baseball, tennis, golf, etc.), or
   vii. information regarding holidays celebrated by various countries (e.g., Gregorian calendar New Year, Chinese Lunar New Year, etc.), or
   viii. information regarding the calendrical time in various countries,
   ix. any combination of i, ii, iii, iv, v, vi, vii, and viii.

The above list of "global contextual information" should not be construed as being restrictive or an exhaustive enumeration of the various forms of "global contextual information." Instead, other types of "global contextual information" may be included in the list above without departing from the scope of the present invention.

Additionally, it will be clear to those skilled in the art, after reading this disclosure, how to make and use alternative embodiments of the present invention in which the call-processing switch 104 identifies the global contextual information before or after receiving the call from the calling entity.

As part of task 202, the call-processing switch 104 identifies contextual information at the calling entity.

In accordance with the illustrative embodiment, call-processing switch 104 uses the geo-location of the calling entity to query a database or terminal (e.g., a Bloomberg Terminal) to retrieve contextual information at the calling entity. For example, if the geo-location of the calling entity is Holmdel, N.J., the call-processing switch 104 will query a database or terminal to retrieve contextual information that is associated with Holmdel, N.J., which may comprises, for example, and without limitation:
   i. information regarding political events in Holmdel, N.J., or
   ii. information regarding the weather in Holmdel, N.J., or
   iii. information regarding naturally occurring catastrophes in Holmdel, N.J., or
   iv. information regarding epidemics in Holmdel, N.J., or
   v. information regarding sporting events in Holmdel, N.J., or
   vi. information regarding the number of times the calling entity called the call-processing switch 104 in Holmdel, N.J., or
   vii. information regarding the calendrical time in Holmdel, N.J., or
   viii. any combination of i, ii, iii, iv, v, vi, and vii.

The above list of "contextual information" at the calling entity should not be construed as being restrictive or an exhaustive enumeration of the various forms of "contextual information" at the calling entity. Instead, other types of "contextual information" at the calling entity may be included in the list above without departing from the scope of the present invention.

As part of task 202, the call-processing switch 104 identifies contextual information based, at least in part, on the geo-location of itself (i.e., call-processing switch 104).

In accordance with the illustrative embodiment, call-processing switch 104 is configured to detect or identify its own geo-location. The call-processing switch 104 queries a database or terminal (e.g., a Bloomberg Terminal) using it's on geo-location to retrieve contextual information associated with its own geo-location. For example, if the geo-location of the call-processing switch 104 is New York City, the call-processing switch 104 will query the database or terminal to retrieve contextual information that pertains to New York City, which may comprise, for example, and without limitation:
   i. information regarding political events in New York City, or
   ii. information regarding the weather in New York City, or
   iii. information regarding naturally occurring catastrophes in New York City, or
   iv. information regarding epidemics in New York City, or
   v. information regarding sporting events in New York City, or
   vi. information regarding the number of times the calling entity called the call-processing switch 104 at New York City, or
   vii. information regarding the calendrical time in New York City, or
   viii. any combination of i, ii, iii, iv, v, vi, and vii.

The above list of "contextual information" at the call-processing switch 104 should not be construed as being restrictive or an exhaustive enumeration of the various forms of "contextual information" at the call-processing switch 104. Instead, other types of "contextual information" at the call-processing switch 104 may be included in the list above without departing from the scope of the present invention.

In accordance with the illustrative embodiment, a Bloomberg Terminal is used by call-processing switch 104 to identify the global contextual information, the contextual information at the calling entity, and the contextual information at the call-processing switch 104, but it will be clear to those skilled in the art, after reading this disclosure, how to make and use alternative embodiments of the present invention in which the call-processing switch 104 uses a different database or terminal to identify the global contextual information, the contextual information at the calling entity, and the contextual information at the call-processing switch 104.

Additionally, it will be clear to those skilled in the art, after reading this disclosure, how to make and use alternative embodiments of the present invention in which the database or terminal storing the global contextual information, the contextual information at the calling entity, and contextual information at the call-processing switch 104 are each co-located with call-processing switch 104 or not co-located with call-processing switch 104.

Figure 3:
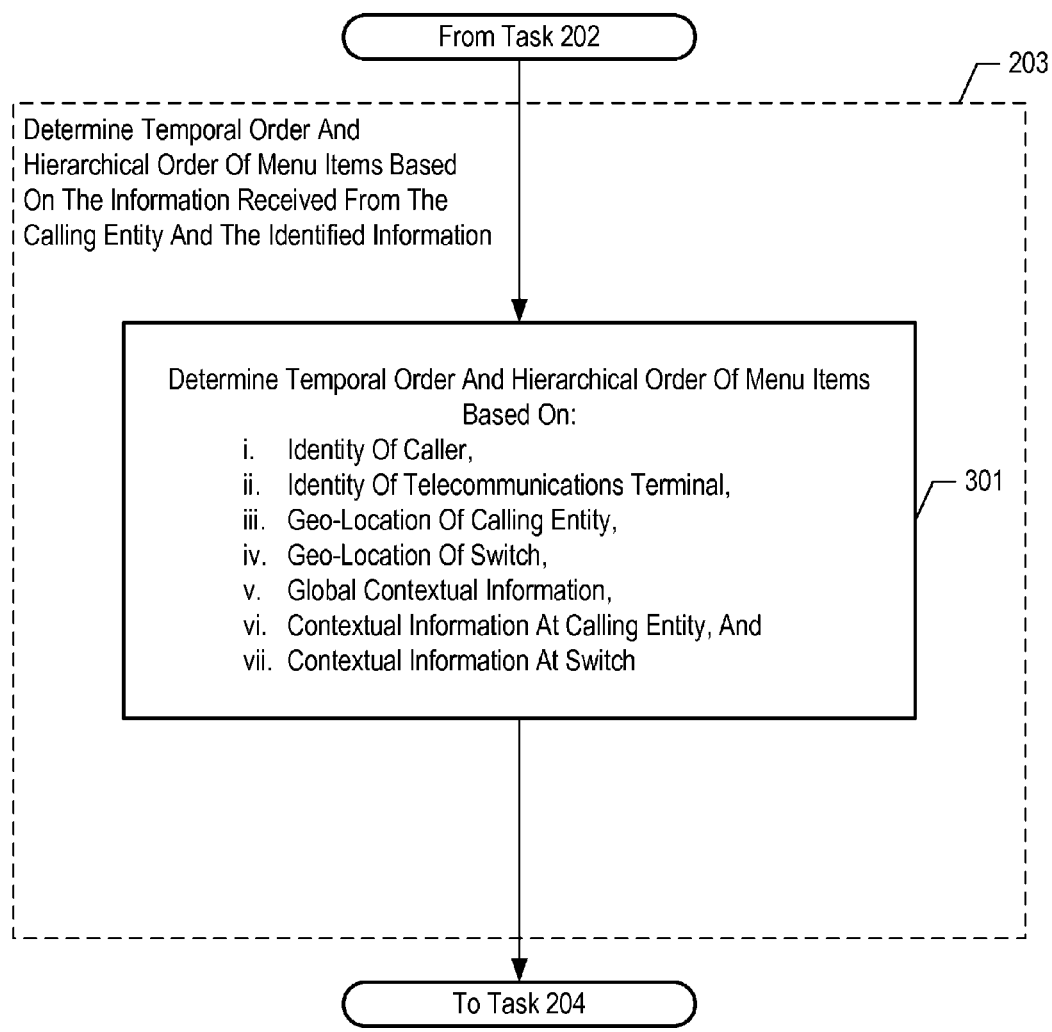
FIG. 3 depicts a flowchart of the salient tasks associated with the operation of task 203 in accordance with the illustrative embodiment of the present invention.

At task 203, the call-processing switch 104 determines a temporal order and a hierarchical order of menu items based, at least in part, on the:
 i. identity of the caller terminal 101, or
 ii. the identity of the caller, or
 iii. geo-location of the calling entity, or
 iv. geo-location of the switch 104,
 v. global contextual information, or
 vi. contextual information at the calling entity, or
 vii. contextual information at the call-processing switch 104, or
 viii. any combination of i, ii, iii, iv, v, vi, and vii,
which will be described in detail below and with respect to task 301 of FIG. 3.

At task 204, the call-processing switch 104 transmits the menu and the menu items to the calling entity in the temporal order and the hierarchical order determined at task 203.

In accordance with the illustrative embodiment, the call-processing switch 104 transmits the menu items in the temporal order and the hierarchical order determined at task 203 as an interactive voice response (IVR), but it will be clear to those skilled in the art, after reading this disclosure, how to make and use alternative embodiments of the present invention in which the call-processing switch 104 transmits, for example, and without limitation:
 i. a graphical representation of the menu and the menu items in the temporal order and the hierarchical order as determined at task 203, or
 ii. an automated voice message of the menu and the menu items in the temporal order and the hierarchical order as determined at task 203, or
 iii. a combination of i and ii.

It will be clear to those skilled in the art, after reading this disclosure, how to make and use alternative embodiments of the present invention in which the graphical representation of the menu and the menu items in the temporal order and the hierarchical order as determined at task 203 can be, for example, and without limitation:
 i. an instant message, or
 ii. an e-mail, or
 iii. a short-message service, or
 iv. a web interface, or
 v. any combination of i, ii, iii, and iv.

Additionally, it will be clear to those skilled in the art, after reading this disclosure, how to make and use alternative embodiments of the present invention in which the call-processing switch 104 transmits the menu items in the temporal order and the hierarchical order determined at task 203 based at least in part on the type of telecommunications terminal the caller entity is calling from.

At task 205, the call-processing switch 105 receives a selection from the calling entity in response to the transmitted menu at task 204.

At task 206, upon receiving the selection from the calling entity, the call-processing switch 104 determines whether another menu should be transmitted to the calling entity based, at least in part, on the selection received from the calling entity.

If the call-processing switch 104 determines that another menu (i.e., a second menu that comprises a plurality of menu items) should be transmitted to the calling entity based, at least in part, on the selection received from the calling entity, the flow moves to task 203 to determine the temporal order and the hierarchical order of the menu items. In other words, the call-processing switch 104 determines the temporal order and the hierarchical order of the menu items based, at least in part, on:
 i. identity of the caller terminal 101, or
 ii. the identity of the caller, or
 iii. geo-location of the calling entity, or
 iv. geo-location of the switch 104,
 v. global contextual information, or
 vi. contextual information at the calling entity, or
 vii. contextual information at the call-processing switch 104, or
 viii. any combination of i, ii, iii, iv, v, vi, and vii,
which will be described in detail below and with respect to task 301 of FIG. 3.

On the other hand, if the call-processing switch 104 determines that no other menu and menu items should be transmitted to the calling entity based, at least in part, on the selection received from the calling entity, then the flow moves to task 207. In other words, the selection received from the calling entity, for example, and without limitation:
 i. routes the calling entity to an enterprise agent so that he/she can interact with the enterprise agent to obtain the desired information, or
 ii. presents the calling entity with at least one automated message that provides the calling entity with the desired information he/she is trying to obtain, or
 iii. a combination of i and ii.

For example, and without limitation, the call-processing switch 104 transmits a first menu that comprises a plurality of menu items. The temporal order and the hierarchical order of the plurality of menu items associated with the first menu is based, at least in part, on the information received from the calling entity at task 201 and the information identified at task 202.

The first menu and the plurality of menu items are transmitted and presented to the calling entity for selection, and upon receiving the calling entity's selection of a menu item associated with the first menu at the call-processing switch 104, the call-processing switch 104 determines whether a second menu that comprises a plurality of menu items should be transmitted to the calling entity.

If a second menu should be transmitted to the calling entity based, at least in part, on the calling entity's selection of a menu item associated with the first menu, the flow moves to task 203 to determine the temporal order and the hierarchical order of menu items for the second menu.

If a second menu should not be transmitted to the calling entity based, at least in part, on the calling entity's selection of a menu item associated with the first menu, the flow moves to task 207 in which the caller is, for example, and without limitation:

i. routed to an enterprise agent so that the calling entity can interact with the enterprise agent to obtain the desired information, or ii. presented with at least one automated message that provides the calling entity with the desired information he/she is trying to obtain, or iii. a combination of i and ii.

At task 207, the call-processing switch 104 performs an operation based, at least in part, on the selection received from the calling entity at task 205.

FIG. 3 depicts a flowchart of the salient tasks associated with the operation of task 203 in accordance with the illustrative embodiment of the present invention.

At task 301, the call-processing switch 104 determines a temporal order and a hierarchical order of menu items based, at least in part, on the:

i. identity of the caller terminal 101, or
ii. the identity of the caller, or
iii. geo-location of the calling entity, or
iv. geo-location of the switch 104,
v. global contextual information, or
vi. contextual information at the calling entity, or
vii. contextual information at the call-processing switch 104, or
viii. any combination of i, ii, iii, iv, v, vi, and vii.

In accordance with the illustrative embodiment, the call-processing switch 104 determines a temporal order and a hierarchical order of menu items based, at least, in part on i, ii, iii, iv, v, vi, and vii.

For example and, in accordance with the illustrative embodiment, the call-processing switch 104 receives the telephone number "(732)123-4567" as the identity of caller terminal 101, and, the account number "987-65-4321" as the identity of the caller associated with the caller terminal 101 as previously described above with respect to task 201.

Based, at least in part, on the telephone number (i.e., (732) 123-4567) and the account number (i.e., 987-65-4321) of the calling entity, the call-processing switch 104 determines that this telephone number combined with this account number frequently contacts the call-processing switch 104 to obtain information regarding the "ring-tone" feature on his cell phone. Therefore, based at least in part on the telephone number and the account number of the calling entity, the call-processing switch 104 will automatically or dynamically reconfigure the temporal order and the hierarchical order of the menu items in the menu so that the "ring-tone" menu item is presented to the caller first. In other words, the "ring-tone" menu item is reconfigured so that it currently has a temporal order of one and a hierarchical order of one.

Additionally, the call-processing switch 104 determines that:

i. when the calling entity's geo-location is Holmdel, N.J., and ii. the contextual information at the calling entity is inclement weather in Holmdel, N.J., the calling entity often contacts the call-processing switch 104 to obtain information pertaining to "Internet connectivity" on his cell-phone. For example, this may be due to the fact that every time there is inclement weather in Holmdel, N.J., the calling entity has unsatisfactory Internet connectivity on his cell phone.

Therefore, based at least in part on the calling entity's geo-location and the contextual information at the calling entity, the call-processing switch 104 will automatically or dynamically reconfigure the temporal order and the hierarchical order of the menu items in the menu so that the "Internet connectivity" menu item is presented to the caller second (i.e., immediately after presenting the "ring-tone" menu item to the calling entity).

Furthermore, the call-processing switch 104 determines that:

i. when the call-processing switch 104's geo-location is New York City, and ii. the contextual information at the call-processing switch 104 is the Subway Series between the New York Yankees and the Mets (i.e., sporting events), the calling entity often contacts call-processing switch 104 to obtain information pertaining to "buying baseball tickets via e-mail" on his cell-phone.

Therefore, based at least in part on the call-processing switch 104's geo-location and the contextual information, the call-processing switch 104 will automatically or dynamically reconfigure the temporal order and the hierarchical order of the menu items in the menu so that the "buying baseball tickets via e-mail" menu item is presented to the caller third (i.e., after presenting the "Internet connectivity" menu item to the calling entity).

In accordance with the illustrative embodiment of the present invention, the call-processing switch 104 reconfigures the temporal order and the hierarchical order of menu items in a menu based, at least in part, on the:

i. identity of the caller terminal 101, or
ii. the identity of the caller, or
iii. geo-location of the calling entity, or
iv. geo-location of the switch 104,
v. global contextual information, or
vi. contextual information at the calling entity, or
vii. contextual information at the call-processing switch 104, but it will be clear to those skilled in the art, after reading this disclosure, how to make and use alternative embodiments of the present invention in which the call-processing switch 104 reconfigures the temporal order and the hierarchical order of the menu items based on any one of i, ii, iii, iv, v, vi, and vii or any combination of i, ii, iii, iv, v, vi, and vii.

Additionally, it will be clear to those skilled in the art, after reading this disclosure, how to make and use alternative embodiments of the present invention in which the call-processing switch 104 reconfigures the menu items of a menu based, at least in part, on combining, for example, and without limitation:

i. identity of the caller terminal 101, or
ii. the identity of the caller, or
iii. geo-location of the calling entity, or
iv. geo-location of the switch 104,
v. global contextual information, or
vi. contextual information at the calling entity, or
vii. contextual information at the call-processing switch 104, or
viii. any combination of i, ii, iii, iv, v, vi, and vii, with statistical information that is indicative of a menu item that is most frequently selected by other calling entities.

For example, and without limitation, the call-processing switch 104 determines that statistical information retrieved from a database or a terminal (e.g., a Bloomberg Terminal) indicates that other calling entities in Holmdel, N.J. frequently select, for example, and without limitation:

i. the "pay cell phone bill" menu item,
ii. during Sep. 1, 2009 through Sep. 15, 2009, and, since the calling entity's geo-location is Holmdel, N.J., and, the contextual information at the calling entity is the calendrical time in Holmdel, N.J. (e.g., the calendrical time at the calling entity is Sep. 5, 2009 in Holmdel, N.J.), the call-processing switch 104 reconfigures the temporal order and the hierarchical order of the menu items as follows:
  i. "pay cell phone bill,"
  ii. "ring-tone",
  iii. "Internet connectivity," and
  iv. "buying baseball tickets via e-mail."

It will be clear to those skilled in the art, after reading this disclosure, how to make and use alternative embodiments of the present invention in which the statistical information of other callers can be stored in the same, or, a different database or terminal (e.g., a Bloomberg Terminal) as the global contextual information, contextual information at the calling entity, and the contextual information at the call-processing switch 104.

Additionally, it will be clear to those skilled in the art, after reading this disclosure, how to make and use alternative embodiments of the present invention in which the call-processing switch 104 is configured to use one or more statistical information for reconfiguring the temporal order and the hierarchical order of menu items.

Figure 4A:
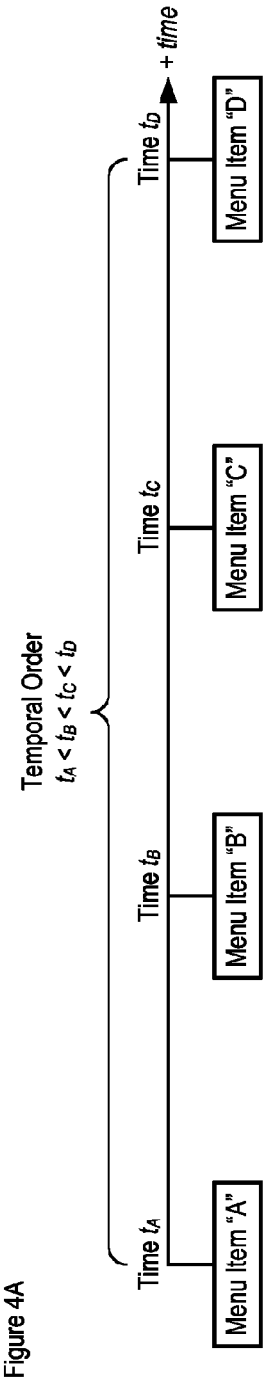
FIG. 4A through FIG. 4C depicts an illustrative temporal order of menu item "A", menu item "B", menu item "C", and menu item "D".

FIG. 4A depicts an illustrative temporal order of menu item "A", menu item "B", menu item "C", and menu item "D".

FIG. 3A depicts an illustrative temporal order of menu item "A", menu item "B", menu item "C", and menu item "D" before the call-processing switch 106 reconfigures the temporal order and the hierarchical order of the menu items. In other words, before the call-processing switch 106 reconfigures the temporal order of the menu items, the menu items are configured as follows:
  i. menu item "A" is presented first at time $t_A$,
  ii. menu item "B" is presented second at time $t_B$,
  iii. menu item "C" is presented third at time $t_C$, and
  iv. menu item "D" is presented fourth at time $t_D$,
wherein time $t_A < t_B < t_C < t_D$.

Figure 4B:
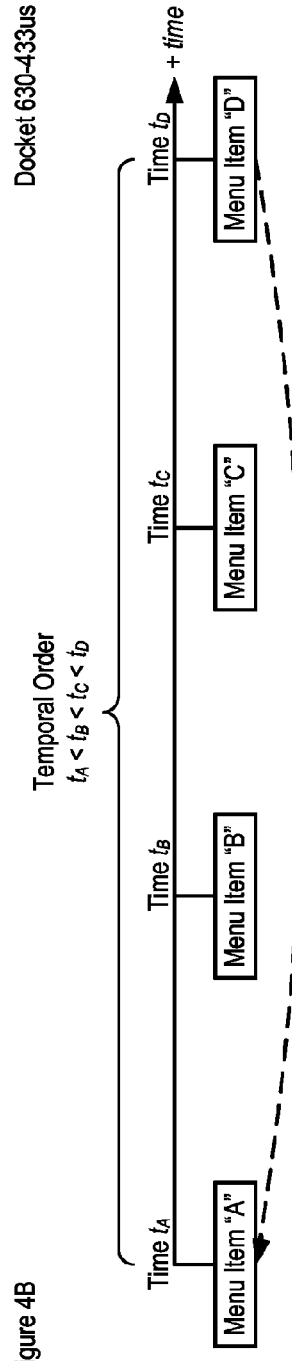

FIG. 4B depicts an illustrative temporal order of menu item "A", menu item "B", menu item "C", and menu item "D" after the call-processing switch 106 reconfigures the temporal order of the menu items based, at least in part, on:
  i. identity of the caller terminal 101, or
  ii. the identity of the caller, or
  iii. geo-location of the calling entity, or
  iv. geo-location of the switch 104,
  v. global contextual information, or
  vi. contextual information at the calling entity, or
  vii. contextual information at the call-processing switch 104, or
  viii. any combination of i, ii, iii, iv, v, vi, and vii.

Figure 4C:
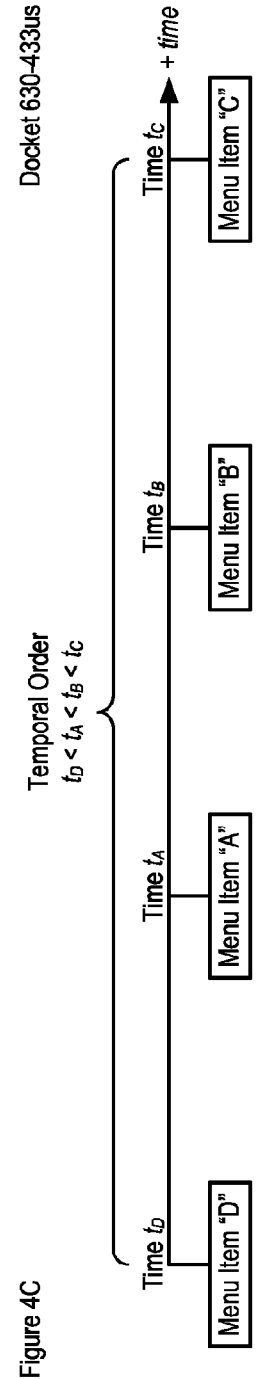

FIG. 4C depicts an illustrative temporal order of menu item "A", menu item "B", menu item "C", and menu item "D" that are transmitted to the calling entity (i.e., caller terminal 101), after the call-processing switch 106 reconfigures the temporal order of the menu items, the menu items are presented to the calling entity in the following temporal order:
  i. menu item "D" is presented first at time $t_A$,
  ii. menu item "A" is presented second at time $t_B$,
  iii. menu item "B" is presented third at time $t_C$, and
  iv. menu item "C" is presented fourth at time $t_D$,
wherein time $t_D < t_A < t_B < t_C$.

For example, and as discussed above, the call-processing switch 104 receives the telephone number "(732)123-4567" as the identity of caller terminal 101, and, the account number "987-65-4321" as the identity of the caller associated with the caller terminal 101. Based, at least in part, on the telephone number (i.e., (732)123-4567) and the account number (i.e., 987-65-4321) of the calling entity, the call-processing switch 104 determines that this telephone number combined with this account number frequently contacts the call-processing switch 104 to obtain information regarding the "ring-tone" feature on his cell phone (i.e., menu item "D" in FIG. 4A).

Therefore, based at least in part on the telephone number and the account number of the calling entity, the call-processing switch 104 will automatically or dynamically reconfigure the temporal order of the menu so that the "ring-tone" menu item (i.e., menu item "D" in FIG. 4B) is presented first.

Once the call-processing switch 106 reconfigures the temporal order of the menu items, that is the "ring-tone" menu item is presented to the caller first, the call-processing switch 106 transmits the reconfigured menu and menu items to the calling entity. In other words, the "ring-tone" menu item is reconfigured so that it currently has a temporal order of one (i.e., menu item "D" in FIG. 4C).

Figure 5A:
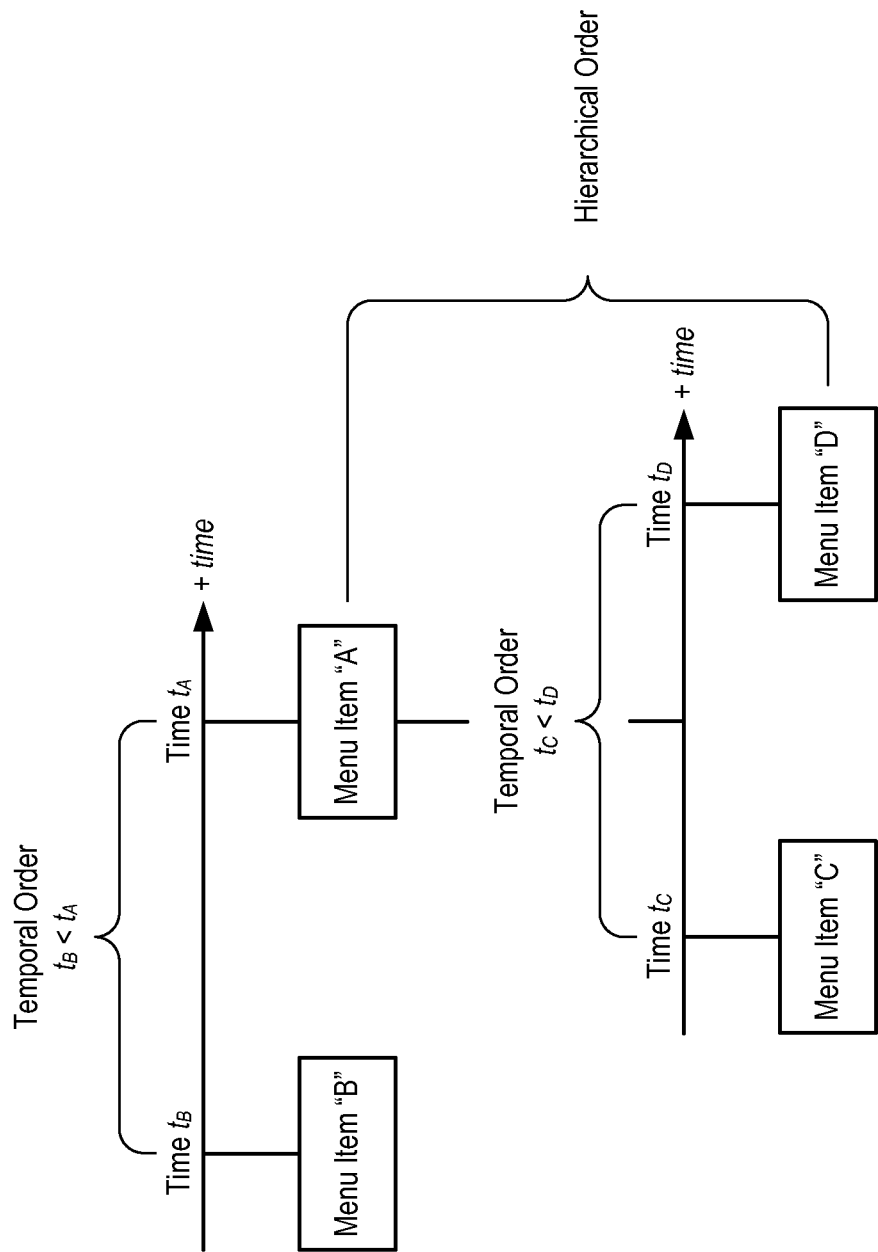
FIG. 5A and FIG. 5B depicts an illustrative temporal order and a hierarchical order of menu item "A", menu item "B", menu item "C", and menu item "D".

FIG. 5A depicts an illustrative temporal order and the hierarchical order of menu item "A", menu item "B", menu item "C", and menu item "D".

FIG. 5A depicts an illustrative temporal order and hierarchical order of menu item "A", menu item "B", menu item "C", and menu item "D" before the call-processing switch 106 reconfigures the temporal order and the hierarchical order of the menu items. In other words, before the call-processing switch 106 reconfigures the temporal order and the hierarchical order of the menu items, the menu items are configured as follows:

Temporal Order and Hierarchical Order in First Hierarchical Level:
  i. menu item "B" is presented first at time $t_A$, and
  ii. menu item "A" is presented second at time $t_B$,
wherein time $t_B < t_A$.

Temporal Order and Hierarchical Order in Second Hierarchical Level:
  i. menu item "C" is presented third at time $t_C$, and
  ii. menu item "D" is presented fourth at time $t_D$,
wherein time $t_C < t_D$.

Figure 5B:
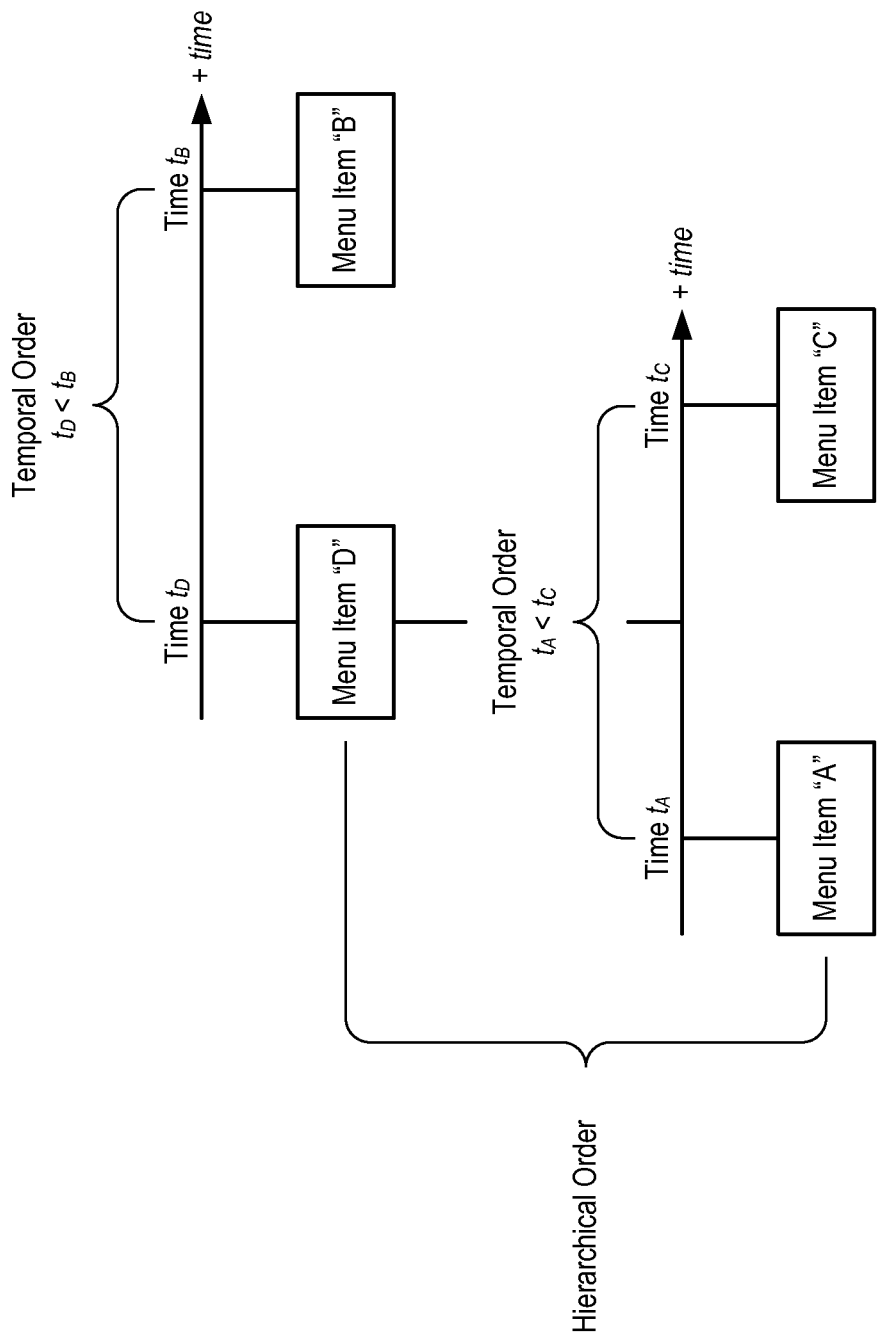

FIG. 5B depicts an illustrative temporal order and hierarchical order of menu item "A", menu item "B", menu item "C", and menu item "D" after the call-processing switch 106 reconfigures the temporal order of the menu items based, at least in part, on:
  i. identity of the caller terminal 101, or
  ii. the identity of the caller, or
  iii. geo-location of the calling entity, or
  iv. geo-location of the switch 104,
  v. global contextual information, or
  vi. contextual information at the calling entity, or
  vii. contextual information at the call-processing switch 104, or
  viii. any combination of i, ii, iii, iv, v, vi, and vii.

In accordance with the illustrative embodiment, after the call-processing switch 106 reconfigures the temporal order and the hierarchical order of the menu items in FIG. 5A, the menu items are presented to the calling entity in the following temporal order:

Temporal Order and Hierarchical Order in First Hierarchical Level:
  i. menu item "D" is presented first at time $t_D$, and
  ii. menu item "B" is presented second at time $t_B$,
wherein time $t_D < t_B$.

Temporal Order and Hierarchical Order in Second Hierarchical Level:
  i. menu item "A" is presented third at time $t_A$, and
  ii. menu item "C" is presented fourth at time $t_C$,
wherein time $t_A < t_C$.

For example, and as discussed above, the call-processing switch 104 receives the telephone number "(732)123-4567" as the identity of caller terminal 101, and, the account number "987-65-4321" as the identity of the caller associated with the caller terminal 101. Based, at least in part, on the telephone number (i.e., (732)123-4567) and the account number (i.e., 987-65-4321) of the calling entity, the call-processing switch 104 determines that this telephone number combined with this account number frequently contacts the call-processing switch 104 to obtain information regarding the "ring-tone" feature on his cell phone (i.e., menu item "D" in FIG. 5A).

Therefore, based at least in part on the telephone number and the account number of the calling entity, the call-processing switch 104 will automatically or dynamically reconfigure the temporal order and the hierarchical order of the menu so that the "ring-tone" menu item (i.e., menu item "D" in FIG. 5B) is presented first.

Once the call-processing switch 106 reconfigures the temporal order and the hierarchical order of the menu items, that is the "ring-tone" menu item is presented to the caller first, the call-processing switch 106 transmits the reconfigured menu and menu items to the calling entity so that the "ring-tone" menu item currently has a temporal order of one and a hierarchical order of one (i.e., menu item "D" in FIG. 5B).

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
    receiving at a call-processing switch, a call from a telecommunications terminal;
    identifying at least one of a first set of an identity of a caller, identity of a caller telecommunications terminal and a geo-location of a calling entity;
    identifying at least one of a second set of global contextual information, contextual information of the calling entity, and contextual information at the call-processing switch;
    dynamically configuring a temporal order and a hierarchical order based on at least one of said identity of the caller terminal, said identity of said caller, said geo-location of said calling entity and said geo-location of said call-processing switch, and at least one of said global contextual information, said contextual information of said calling entity, and said contextual information at said call-processing switch; and
    transmitting, in the dynamically configured temporal order and dynamically configured hierarchical order, from said call-processing switch to said telecommunications terminal:
        i. a first menu item,
        ii. a second menu item, and
        iii. a third menu item.

2. The method of claim 1 wherein said temporal order and said hierarchical are dynamically configured with statistical information that is indicative of a menu item that is most frequently selected by other calling entities with similar identifications from the processes of identifying.

3. The method of claim 1 wherein said process of identifying at least one of a first set comprises identifying a plurality of said first set.

4. The method of claim 1 wherein said process of identifying at least one of a second set comprises identifying a plurality of said second set.

5. The method of claim 1 wherein said process of identifying at least one of a first set comprises identifying a plurality of said first set and said process of identifying at least one of a second set comprises identifying a plurality of said second set.

* * * * *